United States Patent
Murdoch et al.

(10) Patent No.: US 11,386,225 B2
(45) Date of Patent: Jul. 12, 2022

(54) LOCALIZATION OF DID-RELATED CLAIMS AND DATA

(71) Applicant: MICROSOFT TECHNOLOGY LICENSING, LLC, Redmond, WA (US)

(72) Inventors: Brandon Murdoch, Reading (GB); Daniel James Buchner, Los Gatos, CA (US); Ankur Patel, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 283 days.

(21) Appl. No.: 16/397,746

(22) Filed: Apr. 29, 2019

(65) Prior Publication Data

US 2020/0342136 A1    Oct. 29, 2020

(51) Int. Cl.
*G06F 21/62* (2013.01)

(52) U.S. Cl.
CPC ................ *G06F 21/6245* (2013.01)

(58) Field of Classification Search
CPC ... G06F 21/6245; H04L 63/00; H04L 9/3239; H04L 2209/38; H04L 9/3297
USPC ............................................................ 726/1
See application file for complete search history.

(56) References Cited

U.S. PATENT DOCUMENTS

| | | |
|---|---|---|
| 8,650,303 B1 | 2/2014 | Lang et al. |
| 8,744,064 B1 | 6/2014 | Calahan et al. |
| 8,793,509 B1 | 7/2014 | Nelson et al. |
| 8,959,579 B2 | 2/2015 | Barton et al. |
| 9,680,824 B1 | 6/2017 | Rodgers et al. |
| 10,148,643 B2 | 12/2018 | Niemela et al. |
| 10,454,927 B2 | 10/2019 | Oberhauser et al. |
| 10,476,847 B1 | 11/2019 | Smith et al. |
| 10,506,104 B1 | 12/2019 | Shakeri |

(Continued)

FOREIGN PATENT DOCUMENTS

| | | |
|---|---|---|
| WO | 2016060907 A1 | 4/2016 |
| WO | 2018126029 A2 | 7/2018 |

OTHER PUBLICATIONS

"Non Final Office Action Issued in U.S. Appl. No. 16/397,765", dated Oct. 29, 2020, 21 Pages. (MS# 406195-US-NP).

(Continued)

*Primary Examiner* — Kambiz Zand
*Assistant Examiner* — Aubrey H Wyszynski
(74) *Attorney, Agent, or Firm* — Workman Nydegger

(57) ABSTRACT

Embodiments disclosed herein are related to computing systems and methods for localizing how a user will receive and view received DID-related data. The computing system and methods are implemented in the decentralized network that implements a distributed ledger that backs one or more decentralized identities (DID) for one or more users of the computing system. Various sets of rule are accessed. The sets of rules specify how a DID owner will receive and view DID-related data received from a third party entity. The sets of rules are applied to the DID-related data received from the third party entity. The received DID-related data is modified such that the received DID-related data conforms to the one or more sets of rules. The modified DID-related data is provided to the DID owner so that the DID owner is able to view the modified DID-related data according to the applied sets of rules.

20 Claims, 8 Drawing Sheets

(56) References Cited

U.S. PATENT DOCUMENTS

| | | |
|---|---|---|
| 10,572,684 B2 | 2/2020 | Lafever et al. |
| 10,764,752 B1 | 9/2020 | Avetisov et al. |
| 10,779,177 B2 | 9/2020 | Raleigh |
| 11,212,263 B2 | 12/2021 | Murdoch et al. |
| 11,218,313 B1 | 1/2022 | Raghavan et al. |
| 2002/0049749 A1 | 4/2002 | Helgeson et al. |
| 2004/0019807 A1 | 1/2004 | Freund |
| 2004/0098366 A1 | 5/2004 | Sinclair et al. |
| 2004/0128240 A1 | 7/2004 | Yusin |
| 2004/0205243 A1 | 10/2004 | Hurvig et al. |
| 2005/0251792 A1 | 11/2005 | Smith |
| 2006/0075381 A1 | 4/2006 | Laborczfalvi et al. |
| 2006/0174350 A1 | 8/2006 | Roever et al. |
| 2008/0134310 A1 | 6/2008 | Borde et al. |
| 2009/0271840 A1 | 10/2009 | Gillet et al. |
| 2010/0077445 A1 | 3/2010 | Schneider et al. |
| 2010/0122343 A1 | 5/2010 | Ghosh et al. |
| 2012/0017213 A1 | 1/2012 | Hunt et al. |
| 2012/0239938 A1 | 9/2012 | Thurber et al. |
| 2013/0332694 A1 | 12/2013 | Reissner |
| 2014/0007157 A1 | 1/2014 | Harrison et al. |
| 2014/0025949 A1 | 1/2014 | Kay et al. |
| 2014/0173709 A1 | 6/2014 | Eldar et al. |
| 2014/0280888 A1 | 9/2014 | Mcmillan |
| 2014/0280955 A1 | 9/2014 | Stuntebeck et al. |
| 2014/0344420 A1 | 11/2014 | Rjeili et al. |
| 2014/0359729 A1 | 12/2014 | Kreiner et al. |
| 2015/0007265 A1 | 1/2015 | Aissi et al. |
| 2015/0186536 A1 | 7/2015 | Bosworth et al. |
| 2015/0186664 A1 | 7/2015 | Nicolaou |
| 2015/0186669 A1 | 7/2015 | Nicolaou |
| 2015/0235043 A1 | 8/2015 | Haik et al. |
| 2015/0332533 A1 | 11/2015 | Meganck |
| 2015/0356317 A1 | 12/2015 | Ukil et al. |
| 2016/0063239 A1 | 3/2016 | Chen et al. |
| 2016/0065579 A1 | 3/2016 | Chen et al. |
| 2016/0098577 A1 | 4/2016 | Lacey et al. |
| 2016/0140362 A1 | 5/2016 | Aghili et al. |
| 2016/0173281 A1 | 6/2016 | White et al. |
| 2016/0224360 A1 | 8/2016 | Wagner et al. |
| 2016/0239795 A1 | 8/2016 | Burch et al. |
| 2016/0342786 A1 | 11/2016 | Gerebe |
| 2017/0033930 A1 | 2/2017 | Costa et al. |
| 2017/0041296 A1 | 2/2017 | Ford et al. |
| 2017/0097851 A1 | 4/2017 | Chen |
| 2017/0099291 A1 | 4/2017 | Clark et al. |
| 2017/0111175 A1 | 4/2017 | Oberhauser et al. |
| 2017/0161439 A1 | 6/2017 | Raduchel et al. |
| 2017/0180346 A1 | 6/2017 | Suarez et al. |
| 2017/0201490 A1 | 7/2017 | Kinder et al. |
| 2017/0250853 A1 | 8/2017 | Evans |
| 2017/0300394 A1 | 10/2017 | Raut |
| 2017/0316390 A1 | 11/2017 | Smith et al. |
| 2017/0317833 A1 | 11/2017 | Smith et al. |
| 2017/0317948 A1 | 11/2017 | Ilaiwi et al. |
| 2017/0353496 A1 | 12/2017 | Pai et al. |
| 2017/0364450 A1 | 12/2017 | Struttmann |
| 2017/0374177 A1 | 12/2017 | Chrysanthakopoulos et al. |
| 2018/0060496 A1 | 3/2018 | Bulleit et al. |
| 2018/0082053 A1 | 3/2018 | Brown et al. |
| 2018/0097780 A1 | 4/2018 | Olivier et al. |
| 2018/0101842 A1 | 4/2018 | Ventura et al. |
| 2018/0137512 A1 | 5/2018 | Georgiadis et al. |
| 2018/0139238 A1 | 5/2018 | Schultz et al. |
| 2018/0165183 A1 | 6/2018 | Kremp |
| 2018/0176775 A1 | 6/2018 | Obaidi |
| 2018/0198824 A1 | 7/2018 | Pulapaka et al. |
| 2018/0220397 A1 | 8/2018 | Paredes Cabrera et al. |
| 2018/0234422 A1 | 8/2018 | Odom et al. |
| 2018/0239897 A1 | 8/2018 | Ventura |
| 2018/0260404 A1 | 9/2018 | Otis et al. |
| 2018/0285156 A1 | 10/2018 | Corey et al. |
| 2018/0285217 A1 | 10/2018 | Smith et al. |
| 2018/0285594 A1 | 10/2018 | Jarvis et al. |
| 2018/0294956 A1 | 10/2018 | O'brien et al. |
| 2018/0300499 A1 | 10/2018 | Agarwal et al. |
| 2018/0307859 A1* | 10/2018 | LaFever ................. G16H 10/60 |
| 2018/0330081 A1 | 11/2018 | Hua et al. |
| 2018/0351747 A1 | 12/2018 | Spangemacher et al. |
| 2018/0367528 A1 | 12/2018 | Schwarz et al. |
| 2019/0012105 A1 | 1/2019 | Schreter |
| 2019/0012706 A1 | 1/2019 | Navin et al. |
| 2019/0028455 A1 | 1/2019 | Yue et al. |
| 2019/0034617 A1 | 1/2019 | Scarlata et al. |
| 2019/0034920 A1 | 1/2019 | Nolan et al. |
| 2019/0050855 A1 | 2/2019 | Martino et al. |
| 2019/0097812 A1 | 3/2019 | Toth |
| 2019/0098019 A1 | 3/2019 | Coleman et al. |
| 2019/0108116 A1 | 4/2019 | Benes et al. |
| 2019/0116188 A1 | 4/2019 | Praszczalek et al. |
| 2019/0121980 A1 | 4/2019 | Jung et al. |
| 2019/0130405 A1 | 5/2019 | Adams et al. |
| 2019/0146816 A1 | 5/2019 | Reno et al. |
| 2019/0149341 A1 | 5/2019 | Robison et al. |
| 2019/0158536 A1 | 5/2019 | Kraemer et al. |
| 2019/0166133 A1 | 5/2019 | Frederick et al. |
| 2019/0180276 A1 | 6/2019 | Lee et al. |
| 2019/0182257 A1 | 6/2019 | Lee et al. |
| 2019/0188094 A1 | 6/2019 | Ramamoorthi et al. |
| 2019/0188411 A1 | 6/2019 | Kroutik |
| 2019/0251278 A1 | 8/2019 | Kalinichenko et al. |
| 2019/0253523 A1 | 8/2019 | Raduchel et al. |
| 2019/0278887 A1 | 9/2019 | Ramanujam et al. |
| 2019/0305964 A1 | 10/2019 | Hamel et al. |
| 2019/0305967 A1 | 10/2019 | Hamel et al. |
| 2019/0318122 A1* | 10/2019 | Hockey ................. H04L 63/0853 |
| 2019/0319940 A1 | 10/2019 | Hamel et al. |
| 2019/0319987 A1 | 10/2019 | Levy et al. |
| 2019/0333054 A1* | 10/2019 | Cona ..................... G06F 21/31 |
| 2019/0349371 A1 | 11/2019 | Smith et al. |
| 2019/0349372 A1 | 11/2019 | Smith et al. |
| 2019/0354389 A1 | 11/2019 | Du et al. |
| 2020/0004451 A1 | 1/2020 | Prohofsky |
| 2020/0021590 A1 | 1/2020 | Jeuk et al. |
| 2020/0021615 A1 | 1/2020 | Wainner et al. |
| 2020/0034170 A1 | 1/2020 | Chen et al. |
| 2020/0034548 A1 | 1/2020 | Wu et al. |
| 2020/0036519 A1 | 1/2020 | Bitauld et al. |
| 2020/0058091 A1 | 2/2020 | Dcosta et al. |
| 2020/0067907 A1 | 2/2020 | Avetisov et al. |
| 2020/0082071 A1 | 3/2020 | Cherny et al. |
| 2020/0119906 A1 | 4/2020 | Das et al. |
| 2020/0125721 A1 | 4/2020 | Antony et al. |
| 2020/0125738 A1 | 4/2020 | Mahatwo et al. |
| 2020/0134656 A1 | 4/2020 | Padmanabhan |
| 2020/0137064 A1* | 4/2020 | Wu ....................... H04L 63/102 |
| 2020/0145223 A1 | 5/2020 | Yang et al. |
| 2020/0153606 A1 | 5/2020 | Li et al. |
| 2020/0159634 A1 | 5/2020 | Gadgil et al. |
| 2020/0159940 A1 | 5/2020 | Werner et al. |
| 2020/0195437 A1 | 6/2020 | Gallagher et al. |
| 2020/0204557 A1 | 6/2020 | Singh et al. |
| 2020/0211409 A1 | 7/2020 | Latorre et al. |
| 2020/0226285 A1 | 7/2020 | Bulleit et al. |
| 2020/0233760 A1 | 7/2020 | Wu et al. |
| 2020/0244469 A1 | 7/2020 | Riyumkin et al. |
| 2020/0250323 A1 | 8/2020 | Remington et al. |
| 2020/0279257 A1 | 9/2020 | Cheng et al. |
| 2020/0280855 A1 | 9/2020 | Avetisov et al. |
| 2020/0296102 A1 | 9/2020 | Buchner et al. |
| 2020/0304480 A1 | 9/2020 | Buchner et al. |
| 2020/0304560 A1 | 9/2020 | Buchner et al. |
| 2020/0313897 A1 | 10/2020 | Heath et al. |
| 2020/0320220 A1 | 10/2020 | Beno et al. |
| 2020/0327546 A1 | 10/2020 | Pennington et al. |
| 2020/0334114 A1 | 10/2020 | Murdoch et al. |
| 2020/0336483 A1 | 10/2020 | Murdoch et al. |
| 2020/0344234 A1 | 10/2020 | Haque et al. |
| 2020/0344237 A1 | 10/2020 | Murdoch et al. |
| 2020/0349256 A1 | 11/2020 | Murdoch et al. |
| 2020/0349276 A1 | 11/2020 | Murdoch et al. |
| 2020/0351271 A1 | 11/2020 | Murdoch et al. |
| 2020/0374113 A1 | 11/2020 | Noam et al. |
| 2020/0394206 A1 | 12/2020 | Murdoch et al. |

(56) References Cited

U.S. PATENT DOCUMENTS

| | | |
|---|---|---|
| 2021/0014060 A1 | 1/2021 | Georgiadis et al. |
| 2021/0044976 A1 | 2/2021 | Avetisov et al. |
| 2021/0160318 A1 | 5/2021 | Sajeepa et al. |
| 2021/0191827 A1 | 6/2021 | Arumugam et al. |
| 2021/0349988 A1 | 11/2021 | Lobban et al. |
| 2022/0012358 A1 | 1/2022 | Gaddam et al. |

OTHER PUBLICATIONS

"Non Final Office Action Issued in U.S. Appl. No. 16/403,271", dated Oct. 27, 2020, 28 Pages. (MS# 406200-US-NP).
"Non Final Office Action Issued in U.S. Appl. No. 16/402,502", dated Sep. 8, 2020, 13 Pages. (MS# 406203-US-NP).
Barbir, Abbie, "Updated text for X.dlt-sec, Security considerations for using DLT Data in Identity Management", In International Telecommunication Union, SG17-C-0471, Study Group 17, vol. 14/17, Jan. 22, 2019, 19 Pages.
Barbir, Abbie, "Updated text of draft Recommendation ITU-T X.1252 Baseline Identity Management Terms and Definitions", In International Telecommunication Union, T17-SG17-C-0472, Study Group 17, vol. 10/17, Jan. 22, 2019, 27 Pages.
"Why Decentralized Identifiers Are Changing The Future of the Internet, Identity and Finance—SelfKey", Retrieved From: https://selfkey.org/decentralized-identifiers-article/, Apr. 11, 2019, 12 Pages.
Harker, Andy, "Symbian OS Platform Security/08. Native Software Installer", Retrieved From: http://web.archive.org/web/20111031110549/http://wiki.franklinheath.co.uk/index.php/Symbian_OS_Platform_Security/08._Native_Software_Installer, Oct. 31, 2011, 19 Pages.
Hughes, et al., "A Primer for Decentralized Identifiers", Retrieved From: https://w3c-ccg.github.io/did-primer/#did-documents, Jan. 19, 2019, 7 Pages.
Lewis, Antony, "A Gentle Introduction to Self-Sovereign Identity", Retrieved From: https://bitsonblocks.net/2017/05/17/gentle-introduction-self-sovereign-identity/, May 17, 2017, 19 Pages.
Locher, et al., "When Can a Distributed Ledger Replace a Trusted Third Party?", In Repository of arXiv: 1806.10929, Jun. 28, 2018, 9 Pages.
"International Search Report and Written Opinion Issued in PCT Application No. PCT/US20/020586", dated Jun. 26, 2020, 13 Pages. (MS# 406205-WO-PCT).
"International Search Report and Written Opinion Issued in PCT Application No. PCT/US20/020719", dated Jun. 8, 2020, 14 Pages. (MS# 406194-WO-PCT).
"International Search Report and Written Opinion Issued in PCT Application No. PCT/US20/023225", dated Jun. 17, 2020, 14 Pages. (MS# 406202-WO-PCT).
"International Search Report and Written Opinion Issued in PCT Application No. PCT/US20/024364", dated Jun. 26, 2020, 13 Pages. (MS# 406198-WO-PCT).
"International Search Report and Written Opinion Issued in PCT Application No. PCT/US20/024365", dated Jun. 29, 2020, 14 Pages. (MS# 406200-WO-PCT).

"Non Final Office Action Issued in U.S. Appl. No. 16/387,425", dated Mar. 25, 2021, 13 Pages. (MS# 406194-US-NP).
"Final Office Action Issued in U.S. Appl. No. 16/397,765", dated Mar. 17, 2021, 22 Pages. (MS# 406195-US-NP).
"Notice of Allowance Issued in U.S. Appl. No. 16/387,380", dated Jun. 3, 2021, 18 Pages. (MS# 406205-US-NP).
"Non Final Office Action Issued in U.S. Appl. No. 16/402,508", dated Apr. 6, 2021, 15 Pages. (MS# 406198-US-NP).
"Final Office Action Issued in U.S. Appl. No. 16/403,271", dated Apr. 6, 2021, 28 Pages. (MS# 406200-US-NP).
"International Search Report and Written Opinion Issued in PCT Application No. PCT/US20/024528", dated Jun. 17, 2020, 11 Pages. (MS# 406203-WO-PCT).
Sporny, "Verifiable Credentials Data Model 1.0", Retrieved from: https://www.w3.org/TR/2019/CR-verifiable-claims-data-model-20190328/#sharing-information-with-the-wrong-party, Mar. 28, 2019, 95 Pages.
Vossaert, et al., "User-centric identity management using trusted modules", In Mathematical and Computer Modelling, vol. 57, Issues 7-8, Jun. 30, 2012, 16 Pages.
"International Search Report and Written Opinion Issued in PCT Application No. PCT/US2020/023051", dated May 12, 2020, 14 Pages. (MS# 406195-WO-PCT).
"Non Final Office Action Issued in U.S. Appl. No. 16/387,380", dated Feb. 5, 2021, 20 Pages. (MS# 406205-US-NP).
Siano, et al., "A Survey and Evaluation of the Potentials of Distributed Ledger Technology for Peer-to-Peer Transactive Energy Exchanges in Local Energy Markets", In IEEE Systems Journal, vol. 13, Issue 3, Sep. 2019, 13 Pages.
Stutsman, Ryans., "Durability and Crash Recovery in Distributed In-Memory Storage Systems", In A Dissertation Submitted to the Department of Computer Science of Stanford University, Nov. 2013, 146 Pages.
"Non Final Office Action Issued in U.S. Appl. No. 16/397,765", dated Sep. 14, 2021, 28 Pages. (MS# 406195-US-NP).
"Non Final Office Action Issued in U.S. Appl. No. 16/403,271", dated Sep. 13, 2021, 7 Pages. (MS# 406200-US-NP).
"Notice of Allowance Issued in U.S. Appl. No. 16/402,508", dated Aug. 4, 2021, 10 Pages. (MS# 406198-US-NP).
"Notice of Allowance Issued in U.S. Appl. No. 16/387,425", dated Jul. 14, 2021, 10 Pages. (MS# 406194-US-NP).
"Notice of Allowance Issued in U.S. Appl. No. 16/387,380", dated Oct. 20, 2021, 13 Pages.
"Notice of Allowance Issued in U.S. Appl. No. 16/397,765", dated Dec. 7, 2021, 9 Pages.
"Notice of Allowance Issued in U.S. Appl. No. 16/403,271", dated Dec. 7, 2021, 9 Pages.
"Notice of Allowance Issued in U.S. Appl. No. 16/387,380", dated Mar. 21, 2022, 13 Pages.
"Notice of Allowance Issued in U.S. Appl. No. 16/397,765", dated Mar. 11, 2022, 8 Pages.
"Notice of Allowance Issued in U.S. Appl. No. 16/403,271", dated Apr. 19, 2022, 9 Pages.

* cited by examiner

LOCALIZATION OF DID-RELATED CLAIMS AND DATA

BACKGROUND

Most of currently used documents or records that prove identity are issued by centralized organizations, such as governments, schools, employers, or other service centers or regulatory organizations. These organizations often maintain every member's identity in a centralized identity management system. A centralized identity management system is a centralized information system used for organizations to manage the issued identities, their authentication, authorization, roles and privileges. Centralized identity management systems have been deemed as secure since they often use professionally maintained hardware and software. Typically, the identity issuing organization sets the terms and requirements for registering people with the organization. Finally, when a party needs to verify another party's identity, the verifying party often needs to go through the centralized identity management system to obtain information verifying and/or authenticating the other party's identity.

Decentralized Identifiers (DIDs) are a new type of identifier, which are independent from any centralized registry, identity provider, or certificate authority. Distributed ledger technology (such as blockchain) provides the opportunity for using fully decentralized identifiers. Distributed ledger technology uses globally distributed ledgers to record transactions between two or more parties in a verifiable way. Once a transaction is recorded, the data in the section of ledger cannot be altered retroactively without the alteration of all subsequent sections of ledger, which provides a fairly secure platform. In a broader sense, a DID may further include a DID method specifying how a client may register, replace, rotate, and/or recover a key. The DID method may also set a key expiration date.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments disclosed herein are related to computing systems and methods for localizing how a user will receive and view received DID-related data. The computing system and methods are implemented in the decentralized network that implements a distributed ledger that backs one or more decentralized identities (DID) for one or more users of the computing system. Various sets of rule are accessed. The sets of rules specify how a DID owner will receive and view DID-related data received from a third party entity. The sets of rules are applied to the DID-related data received from the third party entity. The received DID-related data is modified such that the received DID-related data conforms to the one or more sets of rules. The modified DID-related data is provided to the DID owner so that the DID owner is able to view the modified DID-related data according to the applied sets of rules.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
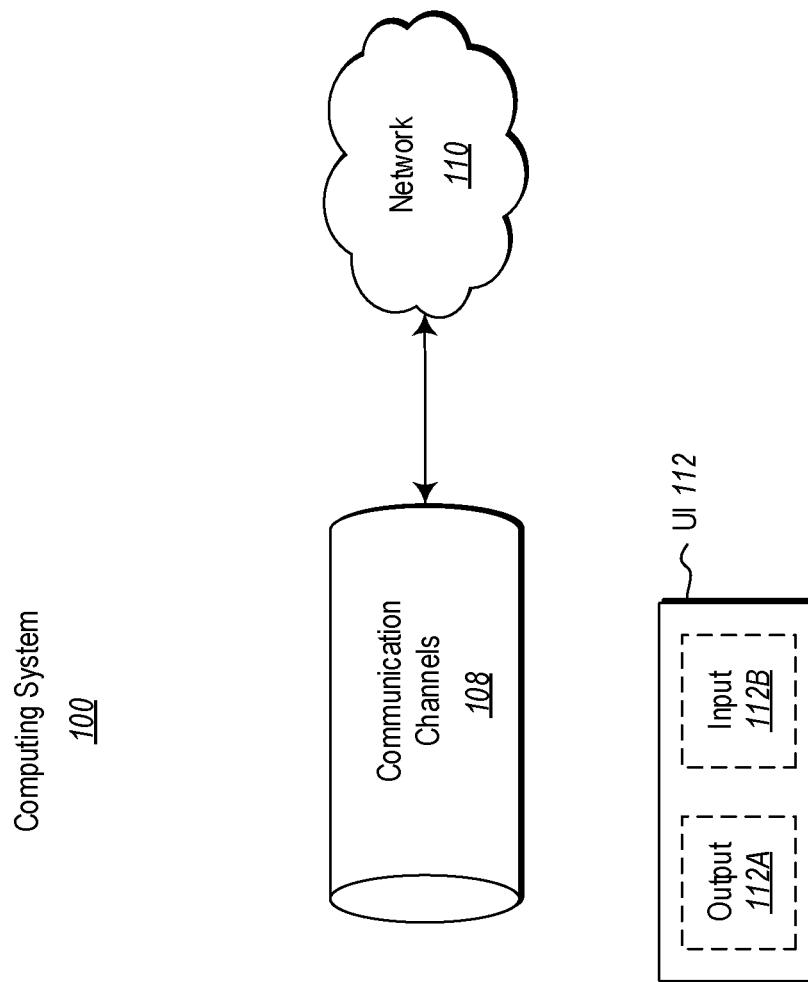
FIG. 1 illustrates an example computing system in which the principles described herein may be employed.

Embodiments disclosed herein are related to computing systems and methods for localizing how a user will receive and view received DID-related data. The computing system and methods are implemented in the decentralized network that implements a distributed ledger that backs one or more decentralized identities (DID) for one or more users of the computing system. Various sets of rule are accessed. The sets of rules specify how a DID owner will receive and view DID-related data received from a third party entity. The sets of rules are applied to the DID-related data received from the third party entity. The received DID-related data is modified such that the received DID-related data conforms to the one or more sets of rules. The modified DID-related data is provided to the DID owner so that the DID owner is able to view the modified DID-related data according to the applied sets of rules.

The embodiments disclosed herein represent a technical advance over existing systems. For example, it is likely that a DID owner may travel from one destination to another destination. If so, any DID-related data such as DID-related claims or attestations or DID-related intents may be provided to the DID owner is a format, language, or the like that is not known to the DID owner. The embodiments disclosed herein provide a way for the DID owner to provide and select user defined rules that will specify how the DID owner will receive, view, and then perhaps interact with the received DID-related data.

In addition, the DID owner may be in a location that has certain laws or regulations that govern or at least suggest how the DID-related data should be presented and what may be included in the DID-related data. The embodiments disclosed herein provide for a DID management module to access various local rules that also may specify how the DID owner will receive, view, and perhaps interact with the received DID-related data. The embodiments disclosed herein also provide for how to integrate the user defined rules and the local rules.

Because the principles described herein may be performed in the context of a computing system, some introductory discussion of a computing system will be described with respect to FIG. 1. Then, this description will return to the principles of the DID platform with respect to the remaining figures.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The processing unit 102 may include a general-purpose processor and may also include a field programmable gate array (FPGA), an application specific integrated circuit (ASIC), or any other specialized circuit. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, virtual or augmented reality, holograms and so forth. Examples of input mechanisms 112B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing system which may correspond to the computing system 100 previously described. The computing systems of the remaining figures include various components or functional blocks that may implement the various embodiments disclosed herein as will be explained. The various components or functional blocks may be implemented on a local computing system or may be implemented on a distributed computing system that includes elements resident in the cloud or that implement aspects of cloud computing. The various components or functional blocks may be implemented as software, hardware, or a combination of software and hardware. The computing systems of the remaining figures may include more or less than the components illustrated in the figures and some of the components may be combined as circumstances warrant.

Figure 2:
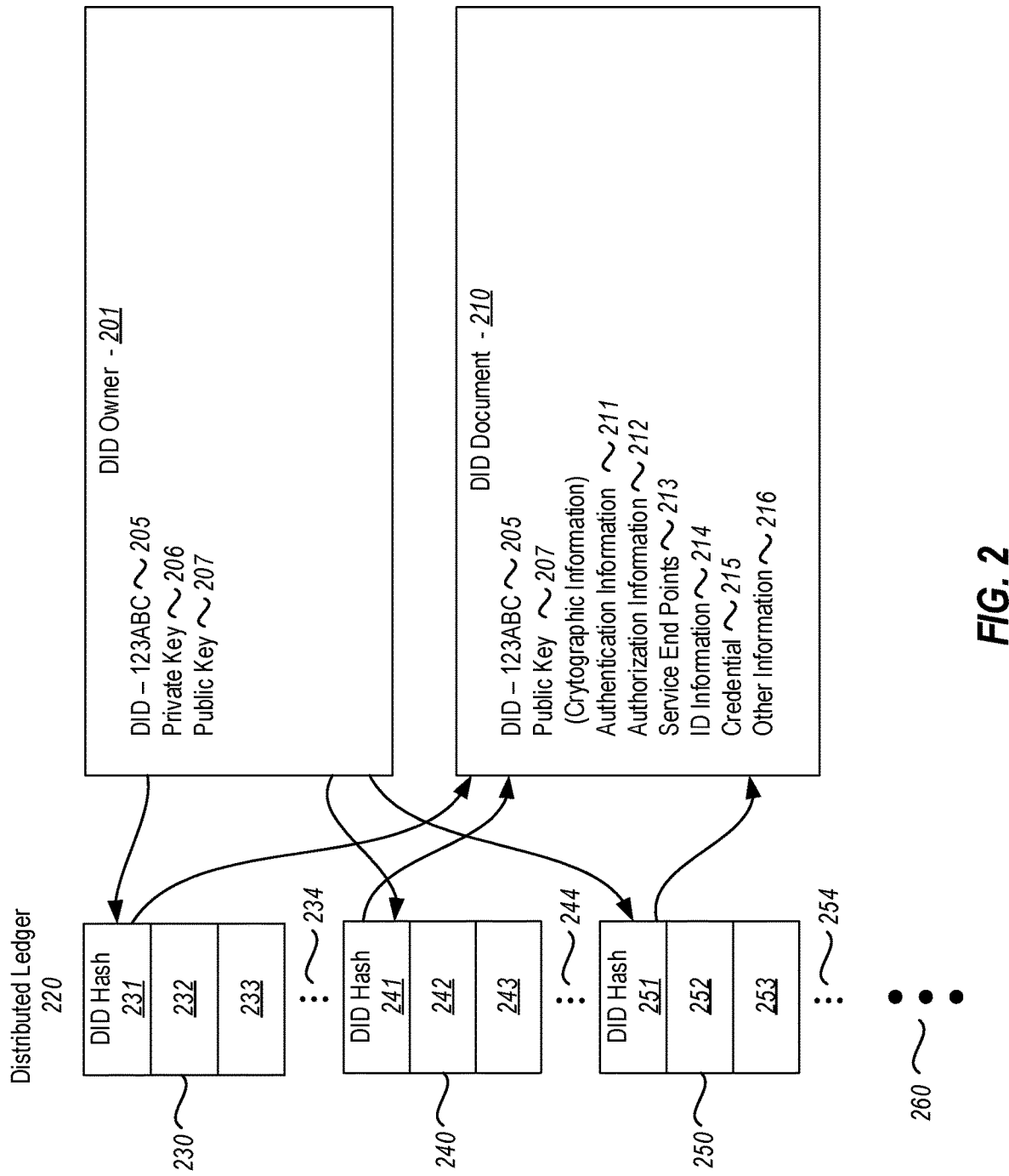
FIG. 2 illustrates an example environment for creating a Decentralized Identification (DID)

Some introductory discussion of a decentralized identifier (DID) and the environment in which they are created and reside will now be given with respect to FIG. 2. As illustrated in FIG. 2, a DID owner 201 may own or control a DID 205 that represents an identity of the DID owner 201. The DID owner 201 may register a DID using a creation and registration service, which will be explained in more detail below.

The DID owner 201 may be any entity that could benefit from a DID. For example, the DID owner 201 may be a human being or an organization of human beings. Such organizations might include a company, department, government, agency, or any other organization or group of organizations. Each individual human being might have a DID while the organization(s) to which each belongs might likewise have a DID.

The DID owner 201 may alternatively be a machine, system, or device, or a collection of machine(s), device(s)

and/or system(s). In still other embodiments, the DID owner 201 may be a subpart of a machine, system or device. For instance, a device could be a printed circuit board, where the subpart of that circuit board are individual components of the circuit board. In such embodiments, the machine or device may have a DID and each subpart may also have a DID. A DID owner might also be a software component such as the executable component 106 described above with respect to FIG. 1. An example of a complex executable component 106 might be an artificial intelligence. Accordingly, an artificial intelligence may also own a DID.

Thus, the DID owner 201 may be any entity, human or non-human, that is capable of creating the DID 205 or at least having the DID 205 created for and/or associated with them. Although the DID owner 201 is shown as having a single DID 205, this need not be the case as there may be any number of DIDs associated with the DID owner 201 as circumstances warrant.

As mentioned, the DID owner 201 may create and register the DID 205. The DID 205 may be any identifier that may be associated with the DID owner 201. Preferably, that identifier is unique to that DID owner 201, at least within a scope in which the DID is anticipated to be in use. As an example, the identifier may be a locally unique identifier, and perhaps more desirably a globally unique identifier for identity systems anticipated to operate globally. In some embodiments, the DID 205 may be a Uniform Resource identifier (URI) (such as a Uniform Resource Locator (URL)) or other pointer that relates the DID owner 201 to mechanisms to engage in trustable interactions with the DID owner 201.

The DID 205 is "decentralized" because it does not require a centralized, third party management system for generation, management, or use. Accordingly, the DID 205 remains under the control of the DID owner 201. This is different from conventional centralized IDs which base trust on centralized authorities and that remain under control of corporate directory services, certificate authorities, domain name registries, or other centralized authority (referred to collectively as "centralized authorities" herein). Accordingly, the DID 205 may be any identifier that is under the control of the DID owner 201 and that is independent of any centralized authority.

In some embodiments, the structure of the DID 205 may be as simple as a user name or some other human-understandable term. However, in other embodiments, for increased security, the DID 205 may preferably be a random string of numbers and letters. In one embodiment, the DID 205 may be a string of 128 numbers and letters. Accordingly, the embodiments disclosed herein are not dependent on any specific implementation of the DID 205. In a very simple example, the DID 205 is shown within the figures as "123ABC".

As also shown in FIG. 2, the DID owner 201 has control of a private key 206 and public key 207 pair that is associated with the DID 205. Because the DID 205 is independent of any centralized authority, the private key 206 should at all times be fully in control of the DID owner 201. That is, the private and public keys should be generated in a decentralized manner that ensures that they remain under the control of the DID owner 201.

As will be described in more detail to follow, the private key 206 and public key 207 pair may be generated on a device controlled by the DID owner 201. The private key 206 and public key 207 pair should not be generated on a server controlled by any centralized authority as this may cause the private key 206 and public key 207 pair to not be fully under the control of the DID owner 201 at all times. Although FIG. 2 and this description have described a private and public key pair, it will also be noted that other types of reasonable cryptographic information and/or mechanisms may also be used as circumstances warrant.

FIG. 2 also illustrates a DID document 210 that is associated with the DID 205. As will be explained in more detail to follow, the DID document 210 may be generated at the time that the DID 205 is created. In its simplest form, the DID document 210 describes how to use the DID 205. Accordingly, the DID document 210 includes a reference to the DID 205, which is the DID that is described by the DID document 210. In some embodiments, the DID document 210 may be implemented according to methods specified by a distributed ledger 220 (such as blockchain) that will be used to store a representation of the DID 205 as will be explained in more detail to follow. Thus, the DID document 210 may have different methods depending on the specific distributed ledger.

The DID document 210 also includes the public key 207 created by the DID owner 201 or some other equivalent cryptographic information. The public key 207 may be used by third party entities that are given permission by the DID owner 201 to access information and data owned by the DID owner 201. The public key 207 may also be used to verify that the DID owner 201 in fact owns or controls the DID 205.

The DID document 210 may also include authentication information 211. The authentication information 211 may specify one or more mechanisms by which the DID owner 201 is able to prove that the DID owner 201 owns the DID 205. In other words, the mechanisms of the authentication information 211 may show proof of a binding between the DID 205 (and thus its DID owner 201) and the DID document 210. In one embodiment, the authentication information 211 may specify that the public key 207 be used in a signature operation to prove the ownership of the DID 205. Alternatively, or in addition, the authentication information 211 may specify that the public key 207 be used in a biometric operation to prove ownership of the DID 205. Accordingly, the authentication information 211 may include any number of mechanisms by which the DID owner 201 is able to prove that the DID owner 201 owns the DID 205.

The DID document 210 may also include authorization information 212. The authorization information 212 may allow the DID owner 201 to authorize third party entities the rights to modify the DID document 210 or some part of the document without giving the third party the right to prove ownership of the DID 205. For example, the authorization information 212 may allow the third party to update any designated set of one or more fields in the DID document 210 using any designated update mechanism. Alternatively, the authorization information may allow the third party to limit the usages of DID 205 by the DID owner 201 for a specified time period. This may be useful when the DID owner 201 is a minor child and the third party is a parent or guardian of the child. The authorization information 212 may allow the parent or guardian to limit use of the DID 201 until such time as the child is no longer a minor.

The authorization information 212 may also specify one or more mechanisms that the third party will need to follow to prove they are authorized to modify the DID document 210. In some embodiments, these mechanisms may be similar to those discussed previously with respect to the authentication information 211.

The DID document 210 may also include one or more service endpoints 213. A service endpoint may include a network address at which a service operates on behalf of the DID owner 201. Examples of specific services include discovery services, social networks, file storage services such as identity servers or hubs, and verifiable claim repository services. Accordingly, the service endpoints 213 operate as pointers for the services that operate on behalf of the DID owner 201. These pointers may be used by the DID owner 201 or by third party entities to access the services that operate on behalf of the DID owner 201. Specific examples of service endpoints 213 will be explained in more detail to follow.

The DID document 210 may further include identification information 214. The identification information 214 may include personally identifiable information such as the name, address, occupation, family members, age, hobbies, interests, or the like of DID owner 201. Accordingly, the identification information 214 listed in the DID document 210 may represent a different persona of the DID owner 201 for different purposes.

A persona may be pseudo anonymous. As an example, the DID owner 201 may include a pen name in the DID document when identifying him or her as a writer posting articles on a blog. A persona may be fully anonymous. As an example, the DID owner 201 may only want to disclose his or her job title or other background data (e.g., a school teacher, an FBI agent, an adult older than 21 years old, etc.) but not his or her name in the DID document. As yet another example, a persona may be specific to who the DID owner 201 is as an individual. As an example, the DID owner 201 may include information identifying him or her as a volunteer for a particular charity organization, an employee of a particular corporation, an award winner of a particular award, and so forth.

The DID document 210 may also include credential information 215, which may also be referred to herein as an attestation. The credential information 215 may be any information that is associated with the DID owner 201's background. For instance, the credential information 215 may be (but not limited to) a qualification, an achievement, a government ID, a government right such as a passport or a driver's license, a payment provider or bank account, a university degree or other educational history, employment status and history, or any other information about the DID owner 201's background.

The DID document 210 may also include various other information 216. In some embodiments, the other information 216 may include metadata specifying when the DID document 210 was created and/or when it was last modified. In other embodiments, the other information 216 may include cryptographic proofs of the integrity of the DID document 210. In still further embodiments, the other information 216 may include additional information that is either specified by the specific method implementing the DID document or desired by the DID owner 201.

FIG. 2 also illustrates a distributed ledger 220. The distributed ledger 220 may be any decentralized, distributed network that includes various computing systems that are in communication with each other. For example, the distributed ledger 220 may include a first distributed computing system 230, a second distributed computing system 240, a third distributed computing system 250, and any number of additional distributed computing systems as illustrated by the ellipses 260. The distributed ledger 220 may operate according to any known standards or methods for distributed ledgers. Examples of conventional distributed ledgers that may correspond to the distributed ledger 220 include, but are not limited to, Bitcoin [BTC], Ethereum, and Litecoin.

In the context of DID 205, the distributed ledger or blockchain 220 is used to store a representation of the DID 205 that points to the DID document 210. In some embodiments, the DID document 210 may be stored on the actual distributed ledger. Alternatively, in other embodiments the DID document 210 may be stored in a data storage (not illustrated) that is associated with the distributed ledger 220.

As mentioned, a representation of the DID 205 is stored on each distributed computing system of the distributed ledger 220. For example, in FIG. 2 this is shown as DID hash 231, DID hash 241, and DID hash 251, which are ideally identical hashed copies of the same DID. The DID hash 231, DID hash 241, and DID hash 251 may then point to the location of the DID document 210. The distributed ledger or blockchain 220 may also store numerous other representations of other DIDs as illustrated by references 232, 233, 234, 242, 243, 244, 252, 253, and 254.

In one embodiment, when the DID user 201 creates the DID 205 and the associated DID document 210, the DID hash 231, DID hash 241, and DID hash 251 are written to the distributed ledger 220. The distributed ledger 220 thus records that the DID 205 now exists. Since the distributed ledger 220 is decentralized, the DID 205 is not under the control of any entity outside of the DID owner 201. DID hash 231, DID hash 241, and DID hash 251 may each include, in addition to the pointer to the DID document 210, a record or time stamp that specifies when the DID 205 was created. At a later date, when modifications are made to the DID document 210, each modification (and potentially also a timestamp of the modification) may also be recorded in DID hash 231, DID hash 241, and DID hash 251. DID hash 231, DID hash 241, and DID hash 251 may further include a copy of the public key 207 so that the DID 205 is cryptographically bound to the DID document 210.

Figure 3:
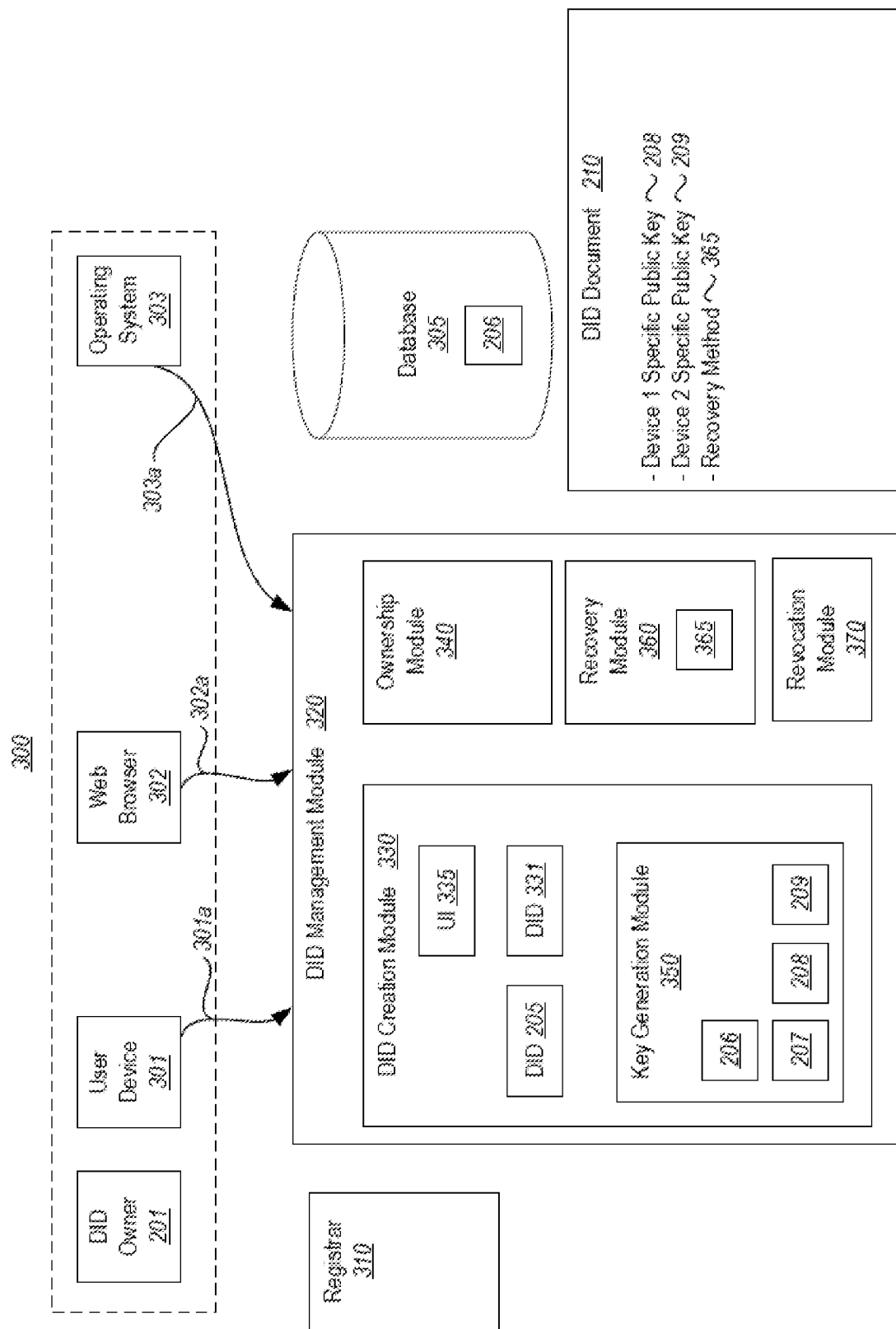
FIG. 3 illustrates an example environment for various DID management operations and services.

Having described DIDs and how they operate generally with reference to FIG. 2, specific embodiments of DID environments will now be explained. Turning to FIG. 3, an environment 300 that may be used to perform various DID management operations and services will now be explained. It will be appreciated that the environment of FIG. 3 may reference elements from FIG. 2 as needed for ease of explanation.

As shown in FIG. 3, the environment 300 may include various devices and computing systems that may be owned or otherwise under the control of the DID owner 201. These may include a user device 301. The user device 301 may be, but is not limited to, a mobile device such as a smart phone, a computing device such as a laptop computer, or any device such as a car or an appliance that includes computing abilities. The device 301 may include a web browser 302 operating on the device and an operating system 303 operating the device. More broadly speaking, the dashed line 304 represents that all of these devices may be owned or otherwise under the control of the DID owner 201.

The environment 300 also includes a DID management module 320. It will be noted that in operation, the DID management module 320 may reside on and be executed by one or more of the user device 301, the web browser 302, and the operating system 303 as illustrated by respective lines 301a, 302a, and 303a. Accordingly, the DID management module 320 is shown as being separate for ease of explanation. It will be appreciated that the DID management module 320 may be considered a "user agent" of the DID owner 201 that may be used to perform various DID related operations and functions as will be explained in more detail to follow.

As shown in FIG. 3, the DID management module 320 includes a DID creation module 330. The DID creation module 330 may be used by the DID owner 201 to create the DID 205 or any number of additional DIDs, such as DID 331. In one embodiment, the DID creation module may include or otherwise have access to a User Interface (UI) element 335 that may guide the DID owner 201 in creating the DID 205. The DID creation module 330 may have one or more drivers that are configured to work with specific distributed ledgers such as distributed ledger 220 so that the DID 205 complies with the underlying methods of that distributed ledger.

A specific embodiment will now be described. For example, the UI 335 may provide a prompt for the user to enter a user name or some other human recognizable name. This name may be used as a display name for the DID 205 that will be generated. As previously described, the DID 205 may be a long string of random numbers and letters and so having a human-recognizable name for a display name may be advantageous. The DID creation module 330 may then generate the DID 205. In the embodiments having the UI 335, the DID 205 may be shown in a listing of identities and may be associated with the human-recognizable name.

The DID creation module 330 may also include a key generation module 350. The key generation module may generate the private key 206 and public key 207 pair previously described. The DID creation module 330 may then use the DID 205 and the private and public key pair to generate the DID document 210.

In operation, the DID creation module 330 accesses a registrar 310 that is configured to the specific distributed ledger that will be recording the transactions related to the DID 205. The DID creation module 330 uses the registrar 310 to record DID hash 231, DID hash 241, and DID hash 251 in the distributed ledger in the manner previously described, and to store the DID document 210 in the manner previously described. This process may use the public key 207 in the hash generation.

In some embodiments, the DID management module 320 may include an ownership module 340. The ownership module 340 may provide mechanisms that ensure that the DID owner 201 is in sole control of the DID 205. In this way, the provider of the DID management module 320 is able to ensure that the provider does not control the DID 205, but is only providing the management services.

As previously discussed, the key generation module 350 generates the private key 206 and public key 207 pair and the public key 207 is then recorded in the DID document 210. Accordingly, the public key 207 may be used by all devices associated with the DID owner 201 and all third parties that desire to provide services to the DID owner 201. Accordingly, when the DID owner 201 desires to associate a new device with the DID 205, the DID owner 201 may execute the DID creation module 330 on the new device. The DID creation module 330 may then use the registrar 310 to update the DID document 210 to reflect that the new device is now associated with the DID 205, which update would be reflected in a transaction on the distributed ledger 220, as previously described.

In some embodiments, however, it may be advantageous to have a public key per device 301 owned by the DID owner 201 as this may allow the DID owner 201 to sign with the device-specific public key without having to access a general public key. In other words, since the DID owner 201 will use different devices at different times (for example using a mobile phone in one instance and then using a laptop computer in another instance), it is advantageous to have a key associated with each device to provide efficiencies in signing using the keys. Accordingly, in such embodiments the key generation module 350 may generate additional public keys 208 and 209 when the additional devices execute the DID creation module 330. These additional public keys may be associated with the private key 206 or in some instances may be paired with a new private key.

In those embodiments where the additional public keys 208 and 209 are associated with different devices, the additional public keys 208 and 209 may be recorded in the DID document 210 as being associated with those devices. This is shown in FIG. 3. It will be appreciated that the DID document 210 may include the information (information 205, 207 and 211 through 216) previously described in relation to FIG. 2 in addition to the information (information 208, 209 and 365) shown in FIG. 3. If the DID document 210 existed prior to the device-specific public keys being generated, then the DID document 210 would be updated by the creation module 330 via the registrar 310 and this would be reflected in an updated transaction on the distributed ledger 220.

In some embodiments, the DID owner 201 may desire to keep secret the association of a device with a public key or the association of a device with the DID 205. Accordingly, the DID creation module 330 may cause that such data be secretly shown in the DID document 210.

As described thus far, the DID 205 has been associated with all the devices under the control of the DID owner 201, even when the devices have their own public keys. However, in some embodiments it may be useful for each device or some subset of devices under the control of the DID owner 201 to each have their own DID. Thus, in some embodiments the DID creation module 330 may generate an additional DID, for example DID 331, for each device. The DID creation module 330 would then generate private and public key pairs and DID documents for each of the devices and have them recorded on the distributed ledger 220 in the manner previously described. Such embodiments may be advantageous for devices that may change ownership as it may be possible to associate the device-specific DID to the new owner of the device by granting the new owner authorization rights in the DID document and revoking such rights from the old owner.

As mentioned, to ensure that the private key 206 is totally in the control of the DID owner 201, the private key 206 is created on the user device 301, browser 302, or operating system 303 that is owned or controlled by the DID owner 201 that executed the DID management module 320. In this way, there is little chance that a third party (and most consequentially, the provider of the DID management module 320) may gain control of the private key 206.

However, there is a chance that the device storing the private key 206 may be lost by the DID owner 201, which may cause the DID owner 201 to lose access to the DID 205. Accordingly, in some embodiments, the UI 335 may include the option to allow the DID owner 201 to export the private key 206 to an off device secured database 305 that is under the control of the DID owner 201. As an example, the database 305 may be one of the identity hubs 410 described below with respect to FIG. 4. A storage module 380 is configured to store data (such as the private key 206 or attestations made by or about the DID owner 201) off device in the database 305 or identity hubs 410. In some embodiments, the private key 206 may be stored as a QR code that may be scanned by the DID owner 201.

In other embodiments, the DID management module 320 may include a recovery module 360 that may be used to recover a lost private key 206. In operation, the recovery module 360 allows the DID owner 201 to select one or more recovery mechanisms 365 at the time the DID 205 is created that may later be used to recover the lost private key. In those embodiments having the UI 335, the UI 335 may allow the DID owner 201 to provide information that will be used by the one or more recovery mechanisms 365 during recovery. The recovery module 360 may then be run on any device associated with the DID 205.

The DID management module 320 may also include a revocation module 370 that is used to revoke or sever a device from the DID 205. In operation, the revocation module may use the UI element 335, which may allow the DID owner 201 to indicate a desire to remove a device from being associated with the DID 205. In one embodiment, the revocation module 370 may access the DID document 210 and may cause that all references to the device be removed from the DID document 210. Alternatively, the public key for the device may be removed. This change in the DID document 210 may then be reflected as an updated transaction on the distributed ledger 220 as previously described.

Figure 4:
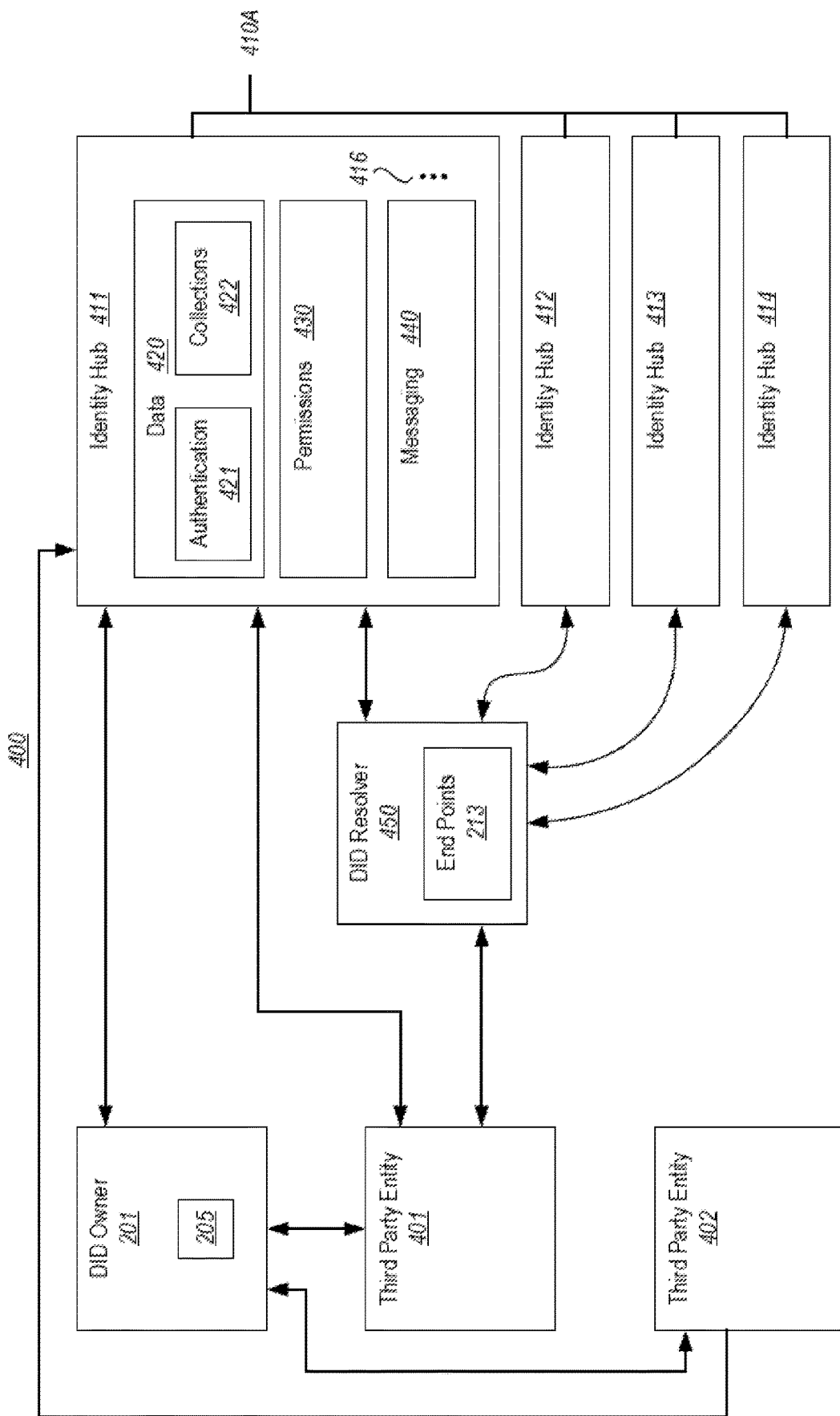
FIG. 4 illustrates example decentralized storage devices or identity hubs.

FIG. 4 illustrates an embodiment of an environment 400 in which a DID such as DID 205 may be utilized. Specifically, the environment 400 will be used to describe the use of the DID 205 in relation to one or more decentralized storage devices or identity hubs 410 that are each under the control of the DID owner 201 to store data belonging to or regarding the DID owner 201. For instance, data may be stored within the identity hubs using the storage module 380 of FIG. 3. It will be noted that FIG. 4 may include references to elements first discussed in relation to FIG. 2 or 3 and thus use the same reference numeral for ease of explanation.

In one embodiment, the identity hubs 410 may be multiple instances of the same identity hub. This is represented by the line 410A. Thus, the various identity hubs 410 may include at least some of the same data and services. Accordingly, if any change is made to one of the identity hubs 410, the change may be reflected in the remaining identity hubs. For example, the first identity hub 411 and second identity hub 412 are implemented in cloud storage (perhaps within the same cloud, or even on different clouds managed by different cloud providers) and thus may be able to hold a large amount of data. Accordingly, a full set of the data may be stored in these identity hubs.

However, the identity hubs 413 and 414 may have less memory space. Accordingly, in these identity hubs a descriptor of the data stored in the first and second identity hubs may be included. Alternatively, a record of changes made to the data in other identity hubs may be included. Thus, changes in one of the identity hubs 410 are either fully replicated in the other identity hubs or at least a record or descriptor of that data is recorded in the other identity hubs.

Because the identity hubs may be multiple instances of the same identity hub, only a full description of the first identity hub 411 will be provided as this description may also apply to the identity hubs 412 through 414. As illustrated, identity hub 411 may include data storage 420. The data storage 420 may be used to store any type of data that is associated with the DID owner 201. In one embodiment the data may be a collection 422 of a specific type of data corresponding to a specific protocol. For example, the collection 422 may be medical records data that corresponds to a specific protocol for medical data. The collection 422 may include any other type of data, such as attestations made by or about the DID owners 201.

In one embodiment, the stored data may have different authentication and privacy settings 421 associated with the stored data. For example, a first subset of the data may have a setting 421 that allows the data to be publicly exposed, but that does not include any authentication to the DID owner 201. This type of data may be for relatively unimportant data such as color schemes and the like. A second subset of the data may have a setting 421 that allows the data to be publicly exposed and that includes authentication to the DID owner 201. A third subset of the data may have a setting 421 that encrypts the subset of data with the private key 206 and public key 207 pair (or some other key pair) associated with the DID owner 201. This type of data will require a party to have access to the public key 207 (or to some other associated public key) in order to decrypt the data. This process may also include authentication to the DID owner 201. A fourth subset of the data may have a setting 421 that restricts this data to a subset of third parties. This may require that public keys associated with the subset of third parties be used to decrypt the data. For example, the DID owner 201 may cause the setting 421 to specify that only public keys associated with friends of the DID owner 201 may decrypt this data. With respect to data stored by the storage module 380, these settings 411 may be at least partially composed by the storage module 380 of FIG. 3.

In some embodiments, the identity hub 411 may have a permissions module 430 that allows the DID owner 201 to set specific authorization or permissions for third parties such as third parties 401 and 402 to access the identity hub. For example, the DID owner 201 may provide access permission to his or her spouse to all the data 420. Alternatively, the DID owner 201 may allow access to his or her doctor for any medical records. It will be appreciated that the DID owner 201 may give permission to any number of third parties to access a subset of the data 420. This will be explained in more detail to follow. With respect to data stored by the storage module 380, these access permissions 430 may be at least partially composed by the storage module 380 of FIG. 3.

The identity hub 411 may also have a messaging module 440. In operation, the messaging module allows the identity hub to receive messages such as requests from parties such as third parties 401 and 402 to access the data and services of the identity hub. In addition, the messaging module 440 allows the identity hub 411 to respond to the messages from the third parties and to also communicate with a DID resolver 450. This will be explained in more detail to follow. The ellipses 416 represent that the identity hub 411 may have additional services as circumstances warrant.

In one embodiment, the DID owner 201 may wish to authenticate a new device 301 with the identity hub 411 that is already associated with the DID 205 in the manner previously described. Accordingly, the DID owner 201 may utilize the DID management module 320 associated with the new user device 301 to send a message to the identity hub 411 asserting that the new user device is associated with the DID 205 of the DID owner 201.

However, the identity hub 411 may not initially recognize the new device as being owned by the DID owner 201. Accordingly, the identity hub 411 may use the messaging module 440 to contact the DID resolver 450. The message sent to the DID resolver 450 may include the DID 205.

The DID resolver 450 may be a service, application, or module that is configured in operation to search the distributed ledger 220 for DID documents associated with DIDs.

Accordingly, in the embodiment the DID resolver 450 may search the distributed ledger 220 using the DID 205, which may result in the DID resolver 450 finding the DID document 210. The DID document 210 may then be provided to the identity hub 411.

As discussed previously, the DID document 210 may include a public key 208 or 209 that is associated with the new user device 301. To verify that the new user device is owned by the DID owner 201, the identity hub 411 may provide a cryptographic challenge to the new user device 301 using the messaging module 440. This cryptographic challenge will be structured such that only a device having access to the private key 206 will be able to successfully answer the challenge.

In this embodiment, since the new user device is owned by DID owner 201 and thus has access to the private key 206, the challenge may be successfully answered. The identity hub 411 may then record in the permissions 430 that the new user device 301 is able to access the data and services of the identity hub 411 and also the rest of the identity hubs 410.

It will be noted that this process of authenticating the new user device 301 was performed without the need for the DID owner 201 to provide any username, password or the like to the provider of the identity hub 411 (i.e., the first cloud storage provider) before the identity hub 411 could be accessed. Rather, the access was determined in a decentralized manner based on the DID 205, the DID document 210, and the associated public and private keys. Since these were at all times in the control of the DID owner 201, the provider of the identity hub 411 was not involved and thus has no knowledge of the transaction or of any personal information of the DID owner 201.

In another example embodiment, the DID owner 201 may provide the DID 205 to the third party entity 401 so that the third party may access data or services stored on the identity hub 411. For example, the DID owner 201 may be a human who is at a scientific conference who desires to allow the third party 401, who is also a human, access to his or her research data. Accordingly, the DID owner 201 may provide the DID 205 to the third party 401.

Once the third party 401 has access to the DID 205, he or she may access the DID resolver 450 to access the DID document 210. As previously discussed, the DID document 210 may include an end point 213 that is an address or pointer to the identity hub 411. The third party 401 may then use the address or pointer to access the identity hub 411.

The third party 401 may send a message to the messaging module 440 asking for permission to access the research data. The messaging module 440 may then send a message to the DID owner 201 asking if the third party 401 should be given access to the research data. Because the DID owner desires to provide access to this data, the DID owner 201 may allow permission to the third party 401 and this permission may be recorded in the permissions 430.

The messaging module 440 may then message the third party 401 informing the third party that he or she is able to access the research data. The identity hub 411 and the third party 401 may then directly communicate so that the third party may access the data. It will be noted that in many cases, it will actually be an identity hub associated with the third party 401 that communicates with the identity hub 411. However, it may be a device of the third party 401 that does the communication.

Advantageously, the above described process allows the identity hub 411 and the third party 401 to communicate and to share the data without the need for the third party to access the identity hub 411 in the conventional manner. Rather, the communication is provisioned in the decentralized manner using the DID 205 and the DID document 210. This advantageously allows the DID owner to be in full control of the process.

As shown in FIG. 4, the third party 402 may also request permission for access to the identity hub 411 using the DID 205 and the DID document 210. Accordingly, the embodiments disclosed herein allow access to any number of third parties to the identity hubs 410.

Figure 5:
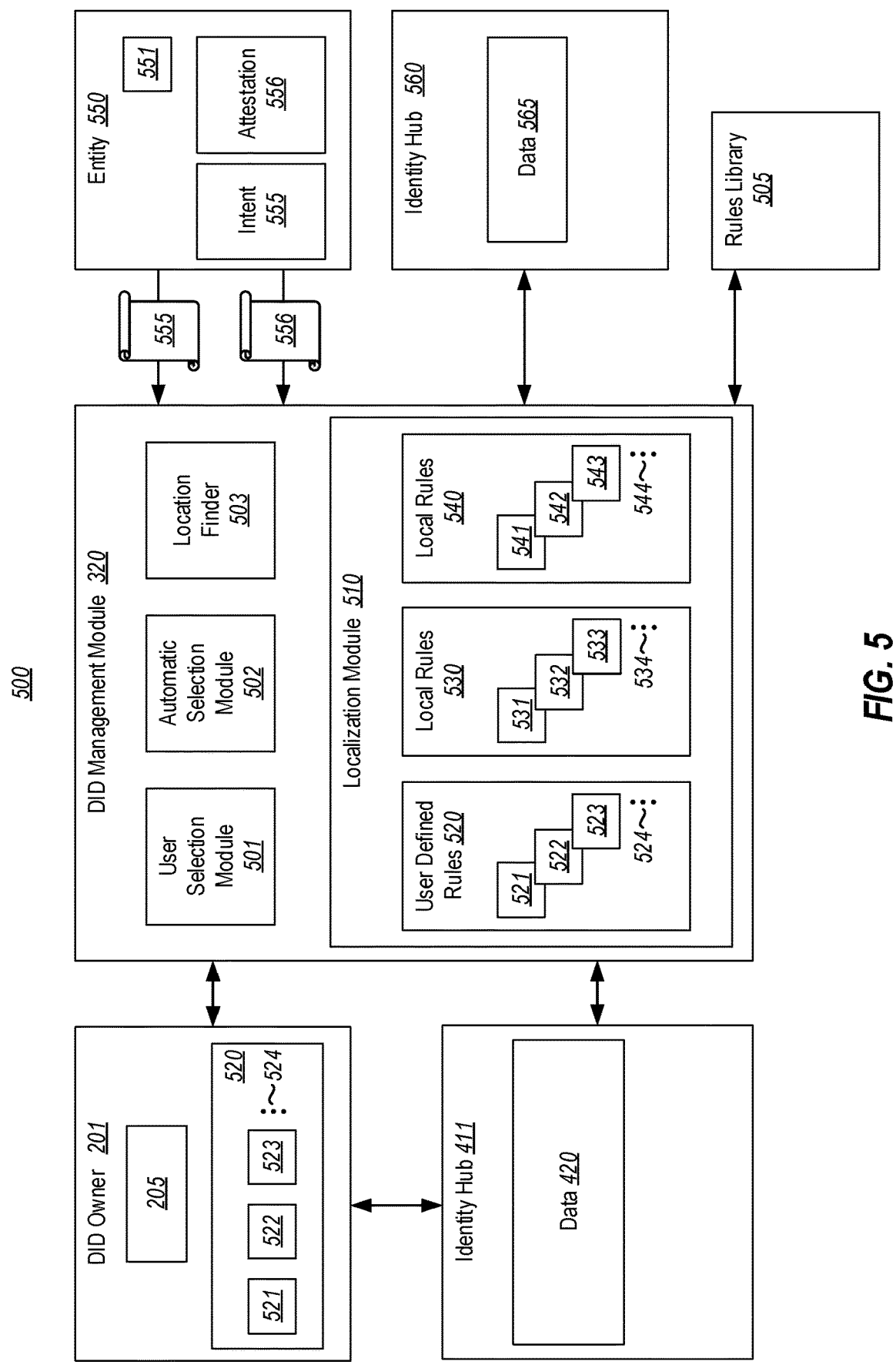
FIG. 5 illustrates an example environment for localizing the reception and view of DID-related data from a third party entity.

FIG. 5 illustrates an embodiment of an environment 500 in which a DID such as DID 205 may be utilized. Specifically, the environment 500 will be used to describe the use of the DID 205 in relation to the selection of one or more localization rules that specify how a DID owner will receive, view and possibly interact with DID-related data from other decentralized network users as will be explained. It will be noted that FIG. 5 may include references to elements first discussed in relation to FIGS. 2-4 and thus use the same reference numeral for ease of explanation.

As illustrated in FIG. 5, the environment 500 include the DID management module 320. In the environment 500, the DID management module 320 may include, in addition to the components discussed in relation to FIG. 3, a localization module 510. In operation, the localization module 510 may automatically select or allow the DID owner 201 to select one or more sets of rules that will govern the experience the DID owner 201 will have when receiving, viewing and potentially interacting with DID-related data from other decentralized network users.

The localization module 510 may include a first set of local rules 530 that may include a rule 531, a rule 532, a rule 533, and potentially any number of additional rules as illustrated by the ellipses 534. A second set of local rules 540 that may include a rule 541, a rule 542, a rule 543, and potentially any number of additional rules as illustrated by the ellipses 544 may also be included in the localization module 510. As will be described in more detail to follow, the local rules 530 and 540 may specify preferences that are required or at least requested to be followed by a specific location when the DID owner 201 receives and views the DID-related data. In some embodiments, the localization module 510 may access the local rules 530 from a rule library 505 that is located in or otherwise associated with a first location. For example, in one embodiment the DID owner 201 may be present in the United States when he or she accesses the management module 320 to create the DID 205 and to enable the functionality of the management module. Accordingly, in such embodiments the localization module 510 may access a local rule library 505 that is located in or otherwise associated with the United States. The local rules 530 may then be obtained from the rules library 505. It will be appreciated that in such embodiments, the local rules 530 may be catered to any laws or regulations that are specific to the United States that govern parameters for how DID-related data should be viewed and interacted with.

In another embodiment, the DID owner 201 may be located in a first country such as the United States, but may have his or her identity hub 411 including the data 420 located in another country, such as Canada. In such embodiments, the localization module 510 may access a rules library 505 that is located in or otherwise associated with Canada. The local rules 540 may then be obtained from the rules library associated with Canada. It will be appreciated that in such embodiments, the local rules 540 may be catered to any laws or regulations that are specific to Canada that govern parameters for how DID-related data should be viewed and interacted with.

In still other embodiments, the management module may access the rules library 505 associated with the United States and obtain the local rules 530 when the DID 205 is generated as previously described. However, the DID owner 201 may then visit or move to another country, such as France. Accordingly, a location finder 503 that is accessible by the management module 320 may indicate that the DID owner 201 has changed location. In some embodiments, the location finder may be a GPS system or the like that is part of the user device 301.

Once the localization module 510 has been notified that the DID owner 201 has changed location, the localization module may access a new rules library 505 that is associated with France. The local rules 540 that are catered to any laws or regulations that are specific to France that govern parameters for how DID-related data should be viewed and interacted with may then be obtained from the rules library 505.

Although FIG. 5 shows the localization module 510 including both the local rules 530 and 540, this need not be the case. In some embodiments, when the DID owner moves to a second location, any local rules that were included in the localization module 510 may be updated with new local rules so that the localization module 510 only includes one set of local rules. Of course, in other embodiments, the localization module 510 may include more than two sets of local rules as circumstances warrant. In still other embodiments, the localization module 510 need not include any local rules as circumstances warrant.

In some embodiments, the localization module 510 may include a set of user defined rules 520 that may include a rule 521, a rule 522, a rule 523, and potentially any number of additional rules as illustrated by the ellipses 524. As will be described in more detail to follow, the user defined rules 520 may allow the DID owner 201 to set preferences that indicate how he or she desires to receive, view and potentially interact with the DID-related data. For example, the user defined rule 521 may allow the DID owner 201 to specify what language he or she would like to view and interact with the DID-related data in. The rules 522, 523, and 524 may likewise allow the DID owner 201 to specify other desired parameters for how DID-related data should be viewed and interacted with.

In some embodiments, the DID management module 320 may include a user selection module 501. In operation, the user selection module 501 may allow the DID owner 201 to select which of the user defined rules 520 or local rules 530 or 540 to apply. In other embodiments, the DID management module may include an automatic selection module 502. The automatic selection module 502 may work in conjunction with the location finder 503 to determine the location of the DID owner 201 and then to apply the local rules for that location. Alternatively, the automatic selection module 502 may apply local rules of the location of the data 420 as circumstances warrant.

As illustrated, the environment 500 may include a third party entity 550, which may have or otherwise be associated with a DID 551. It will be appreciated that the DID 551 may be generated in a manner similar to that of the DID 205. In addition, although not illustrated, the DID 551 may have an associated DID document similar to that of DID document 210. The entity 550 may also be associated with an identity hub 560 that stores various DID-related data 565 that is controlled by the entity 560.

As illustrated, the entity 550 may provide a DID-related intent 555 to the DID owner 201 via the DID management module 320. The DID-related intent 555 may be an offer to sell or buy a product or service. Alternatively, the DID-related intent 555 may be a request for other types of DID-related data such as a DID-related signed attestation or claim from the DID owner 201. The entity 550 may also provide a DID-related signed attestation or verified claim 556, such as the attestation 215 previously discussed, to the DID owner 201 via the DID management module 320. Various specific examples of using the localization module 510 and the one or more sets of rules 520, 530, and 540 will now be explained in relation to an interaction between the DID owner 201 and the entity 550 using the DID-related intent 555 and/or the DID-related attestation 556, both of which are examples of DID-related data.

Figure 6:
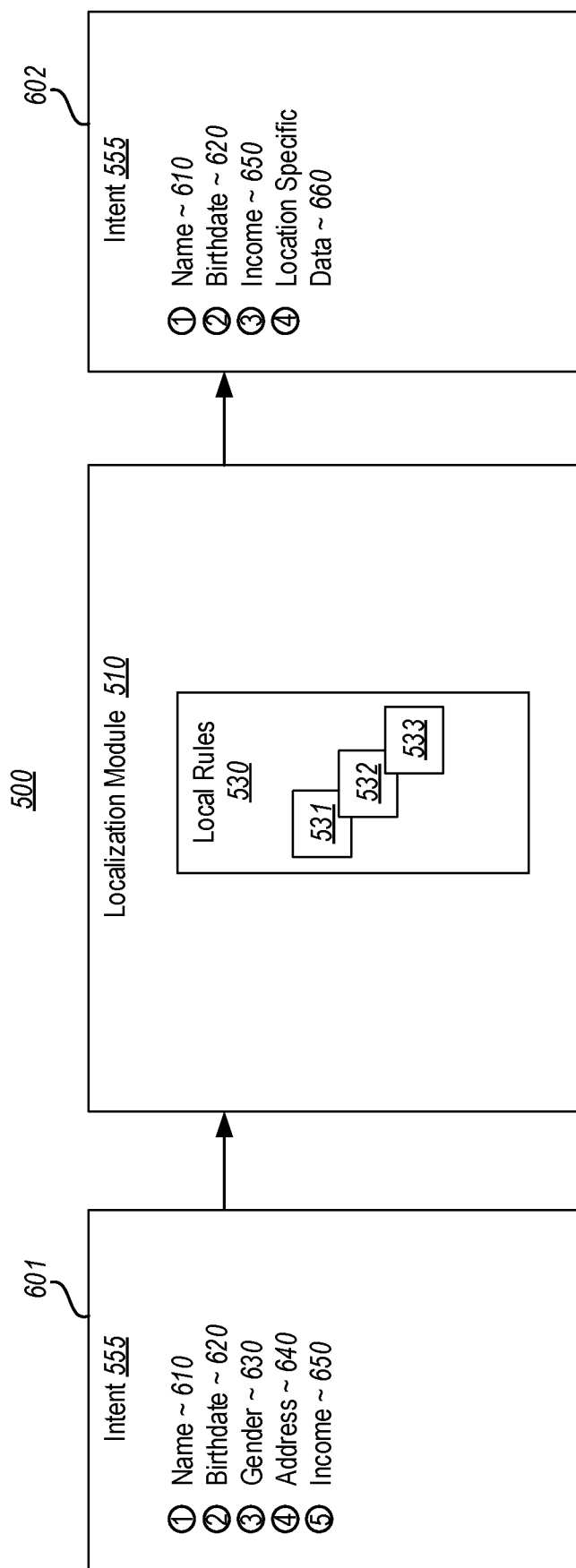
FIG. 6 illustrates a specific example of the environment of FIG. 5.

Attention is first given to FIG. 6, which illustrates a specific example of the environment 500. As shown in FIG. 6, the DID-related intent 555 is provided by the entity 550 to the DID owner 201 via the management module 320 as shown at 601. As shown in the embodiment of FIG. 6 a set of local rules 530 have been accessed by the localization module 510 based on the present location of the DID owner 201 in the manner previously described.

Suppose that the entity 550 is a credit card company and the DID-related intent 555 is an offer for the DID owner 201 to sign up for a new credit card. Accordingly, the DID-related intent 555 may request that the DID owner 201 provide information that may be relevant to the entity 550 in determining if the DID owner 201 should get the credit card. As illustrated, the DID-related intent 555 may include a block 610 that requests the DID owner 201's name, a block 620 that requests the DID owner 201's birthdate, a block 630 that requests the DID owner 201's gender, a block 640 that requests the DID owner 201's address, and a block 650 that requests the DID owner 201's income.

Suppose that the present location of the DID owner 201 is a country that does not allow that the gender or address of the DID owner 201 be requested so as to prevent discrimination based on gender or living location and that this is specified in the local rules 530. Accordingly, the localization module 510 may apply the local rules 530 to the DID-related intent 555.

As shown at 602, this may result in the localization module 510 modifying the DID-related intent 555 to conform to the local rules 530. For example, as shown the DID-related intent 555 no longer includes the block 630 that requests the DID owner 201's gender and the block 640 that requests the DID owner 201's address. In addition, a new block 660 that includes data specific to the present location of the DID owner may be added to the DID-related intent 555. The modified DID-related intent 555 may then be provided to the DID owner 201. Thus, the DID owner 201 only views the modified DID-related intent 555 and is able to interact with the intent by answering those questions that are part of the modified intent.

Figure 7:
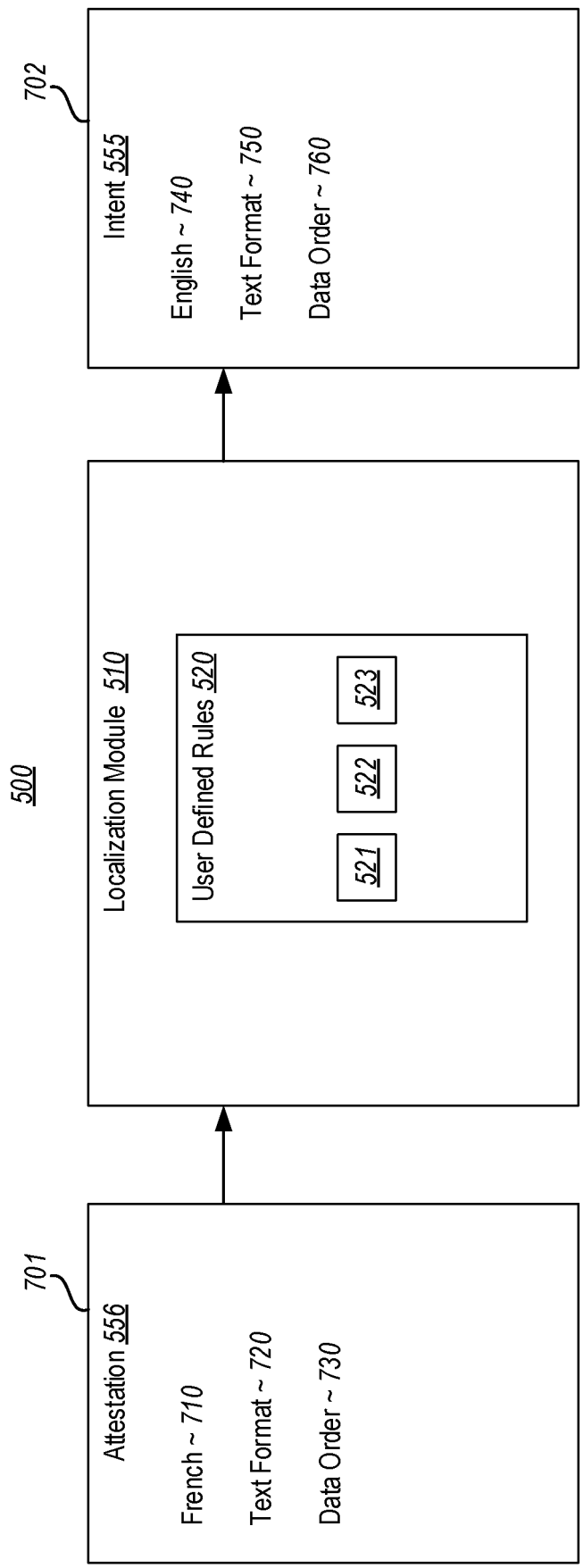
FIG. 7 illustrates another specific example of the environment of FIG. 5.

Attention is now given to FIG. 7, which illustrates another specific example of the environment 500. As shown in FIG. 7, the DID-related attestation 556 is provided by the entity 550 to the DID owner 201 via the management module 320 as shown at 701. As shown in the embodiment of FIG. 7 a set of user defined rules 520 is included in the localization module 510.

Suppose the entity 550 is a French company who the DID owner 201 has requested the DID-related attestation 556 from. Accordingly, as shown at 701 the DID-related attestation 556 may be in the French language as denoted at 710.

Further the attestation, may have a particular text format 720 and data ordering 730 that are typically used in the French language.

Suppose further that DID owner 201 is a citizen of the United Kingdom who does not speak or understand the French language. Accordingly, the localization module may apply the user defined rules 520. In the embodiment, the user defined rule 521 may specify that the English language be used for attestations. In addition, the user defined rule 522 may specify a desired text format, while the user defined rule 760 may specify a desired data ordering.

As shown at 702, this may result in the localization module 510 modifying DID-related attestation 556 to conform to the user defined rules 520. As shown at 740, the attestation may be in the English language. In addition, a desired text format 750 and data order 760 may be used in the attestation. The modified DID-related attestation 556 may then be provided to the DID owner 201. Thus, the DID owner 201 only views the modified DID-related attestation 556 and is able to interact with the attestation in the manner desired by the DID owner 201.

In some embodiments, the localization module 510 may include a set of user defined rules 520 and a set of local rules 530 that may be in conflict. For example, in the example embodiment of FIG. 7, the user defined rules may specify that the attestation be in the English language as previously described. However, the DID owner 201 may be visiting France and a set of local rules 530 may specify that the attestation should be in French. In one embodiment, the management module 320 may prompt the DID owner to select which rule set to use. Since the DID owner is only visiting France, he or she may want the user defined rules 520 to control. Accordingly, the DID owner 201 may use the user selection module 501 to make this selection. In other embodiments, the DID owner 201 may select the local rules 530 if he or she is worried that a law or the like will be violated if the local rules are not complied with.

In other embodiments, the management module 320 may determine that a law or the like will be violated if the local rules 530 are not complied with. Accordingly, in such embodiments the automatic selection module 502 may automatically select the local rules 530 to be used. In still other embodiments, the DID owner 201 may specify that the automatic selection module 502 always be allowed to make a selection based on the local rules as circumstances warrant.

Of course, in further embodiments, both the user defined rules 520 and the local rules 530 and/or 540 may both be implemented while interacting with the DID-related intent 555 or the DID-related attestation 556. In other words, there may be instances where the local rules will control for the requirement that they specify. However, the user defined rules may still control for those elements that are not in conflict with the local rules.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 8:
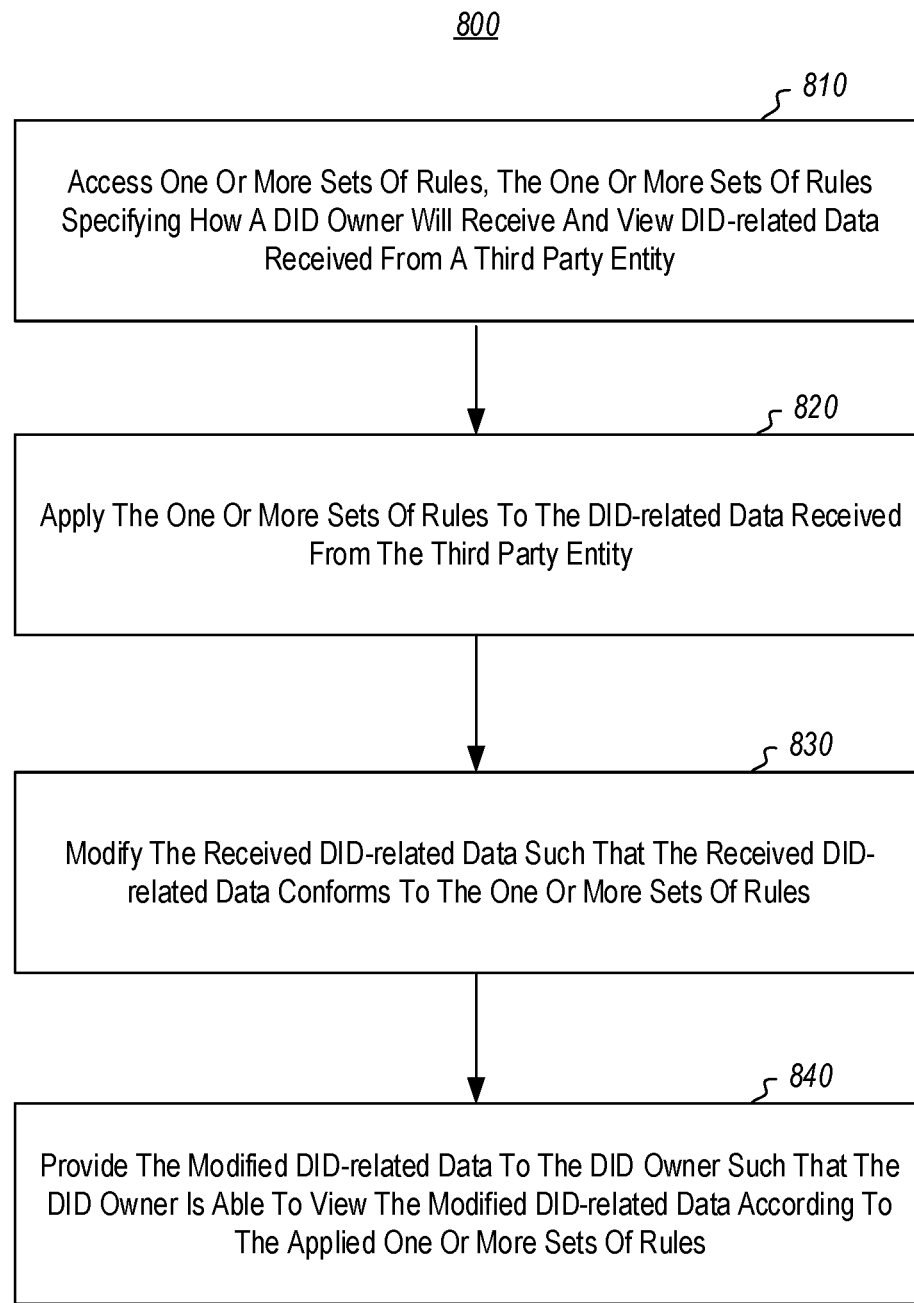
FIG. 8 illustrates a flow chart of an example method for localizing how a user will receive and view received DID-related data.

FIG. 8 illustrates a flow chart of an example method 800 for localizing how a user will receive and view received DID-related data. The method 800 will be described with respect to one or more of FIGS. 2-7 discussed previously.

The method 800 includes accessing one or more sets of rules, the one or more sets of rules specifying how a DID owner will receive and view DID-related data received from a third party entity (810). For example, as previously discussed the localization module 510 may access one or more of the user defined rules 520, the first local rules 530, or the second local rules 540. These rules specify how the DID owner 201 may receive and view DID-related data such as the DID-related intent 555 or the DID-related attestation 556 from the third party entity 550.

The method 800 includes applying the one or more sets of rules to the DID-related data received from the third party entity (820). For example, as previously described the localization module 510 may apply one or more of the user defined rules 520, the first local rules 530, or the second local rules 540 to the DID-related data such as the DID-related intent 555 or the DID-related attestation 556.

The method 800 includes modifying the received DID-related data such that the received DID-related data conforms to the one or more sets of rules (830). For example, as previously described the localization module 510 may modify the DID-related data such as the DID-related intent 555 or the DID-related attestation 556 as shown at 602 and 702 so that the DID-related data conforms to the user defined rules 520, the first local rules 530, or the second local rules 540.

The method 800 includes providing the modified DID-related data to the DID owner such that the DID owner is able to view the modified DID-related data according to the applied one or more sets of rules (840). For example, as previously described the DID owner 201 is able to view and then interact with the modified DID-related data. As mentioned, the DID owner 201 only sees the modified DID-related data, thus ensuring that his or her experience is based on the local rules and/or the user defined rules.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system that is implemented in a decentralized network that implements a distributed ledger, the distributed ledger being configured to back one or more decentralized identities (DID) for one or more users of the computing system, the computing system comprising:
   one or more processors; and
   one or more computer-readable hardware storage devices that store computer-executable instructions that are executable by the one or more processors to cause the computing system to:
      access two or more sets of rules, the two or more sets of rules specifying how a DID owner will receive and view DID-related data received from a third party entity, the two or more sets of rules comprising a first set of rules and a second set of rules;
      determine that the first set of rules at least partially conflicts with the second set of rules;

identify a subset of rules in the first set of rules that do not conflict with the second set of rules;
apply all of the second set of rules to the DID-related data;
apply the subset of rules in the first set of rules to the DID-related data while refraining from applying rules in the first set of rules that do conflict with the second set of rules such that the second set of rules are prioritized over the first set of rules;
modify the received DID-related data such that the received DID-related data conforms to whichever rules were applied to the DID-related data; and
provide the modified DID-related data to the DID owner such that the DID owner is able to view the modified DID-related data according to the applied rules.

2. The computing system according to claim 1, wherein the DID-related data comprises one of a DID-related intent or a DID-related attestation.

3. The computing system according to claim 1, wherein the two or more sets of rules includes a user defined set of rules that specifies parameters desired by the owner of the DID.

4. The computing system according to claim 1, wherein the two or more sets of rules include one or more sets of local rules that are specific to a particular location.

5. The computing system according claim 4, wherein the one or more sets of local rules are based on a location of where the DID owned by the DID owner was generated or where a management module controlled by the DID owner was implemented.

6. The computing system of claim 4, wherein the wherein the one or more sets of local rules are based on a current location of the owner of the DID owner.

7. The computing system of claim 1, wherein accessing the two or more sets of rules comprises:
accessing a first set of local rules based on a first location of the DID owner when the DID owned by the DID owner was generated or where a management module controlled by the DID owner was implemented;
detecting that the DID owner has moved to a second location that is different from the first location; and
accessing a second set of local rules that are based the second location.

8. The computing system of claim 1, wherein applying the two or more sets of rules to the DID-related data received from the third party entity comprises:
receiving input from the DID owner, said input selecting a particular one of the two or more sets of rules to be applied; and
applying the selected particular one of the sets of rules to the DID-related data received from the third party entity.

9. The computing system of claim 1, wherein applying the two or more sets of rules to the DID-related data received from the third party entity comprises:
automatically selecting a particular one of the two or more sets of rules to be applied; and
applying the selected particular one of the sets of rules to the DID-related data received from the third party entity.

10. A method implemented using a computing system that is implemented in a decentralized network that implements a distributed ledger, the distributed ledger being configured to back one or more decentralized identities (DID) for one or more users of the computing system, said method localizing how a user will receive and view received DID-related data, the method comprising:
accessing two or more sets of rules, the two or more sets of rules specifying how a DID owner will receive and view DID-related data received from a third party entity, the two or more sets of rules comprising a first set of rules and a second set of rules;
determining that the first set of rules at least partially conflicts with the second set of rules;
identifying a subset of rules in the first set of rules that do not conflict with the second set of rules;
applying all of the second set of rules to the DID-related data;
applying the subset of rules in the first set of rules to the DID-related data while refraining from applying rules in the first set of rules that do conflict with the second set of rules such that the second set of rules are prioritized over the first set of rules;
modifying the received DID-related data such that the received DID-related data conforms to whichever rules were applied to the DID-related data; and
providing the modified DID-related data to the DID owner such that the DID owner is able to view the modified DID-related data according to the applied rules.

11. The method according to claim 10, wherein the DID-related data comprises one of a DID-related intent or a DID-related attestation.

12. The method according to claim 10, wherein the two or more sets of rules includes a user defined set of rules that specifies parameters desired by the owner of the DID.

13. The method according to claim 10, wherein the two or more sets of rules includes one or more sets of local rules that are specific to a particular location.

14. The method according to claim 13, wherein the one or more sets of local rules are based on a location of where the DID owned by the DID owner was generated or where a management module controlled by the DID owner was implemented.

15. The method according to claim 13, wherein the wherein the one or more sets of local rules are based on a current location of the owner of the DID owner.

16. The method according to claim 10, wherein accessing the two or more sets of rules comprises:
accessing a first set of local rules based on a first location of the DID owner when the DID owned by the DID owner was generated or where a management module controlled by the DID owner was implemented;
detecting that the DID owner has moved to a second location that is different from the first location; and
accessing a second set of local rules that are based the second location.

17. The method according to claim 16, wherein a location finder of a device associated with the DID owner detects that the DID owner has moved to the second location.

18. The method according to claim 10, wherein applying the two or more sets of rules to the DID-related data received from the third party entity comprises:
receiving input from the DID owner, said input selecting a particular one of the two or more sets of rules to be applied; and
applying the selected particular one of the sets of rules to the DID-related data received from the third party entity.

19. The method according to claim 10, wherein applying the two or more sets of rules to the DID-related data received from the third party entity comprises:
- automatically selecting a particular one of the two or more sets of rules to be applied; and
- applying the selected particular one of the sets of rules to the DID-related data received from the third party entity.

20. One or more hardware storage devices that store instructions that are executable by a computer system to cause the computer system to:
- access two or more sets of rules, the two or more sets of rules specifying how a decentralized identity (DID) owner will receive and view DID-related data received from a third party entity, the two or more sets of rules comprising a first set of rules and a second set of rules;
- determine that the first set of rules at least partially conflicts with the second set of rules;
- identify a subset of rules in the first set of rules that do not conflict with the second set of rules;
- apply all of the second set of rules to the DID-related data;
- apply the subset of rules in the first set of rules to the DID-related data while refraining from applying rules in the first set of rules that do conflict with the second set of rules such that the second set of rules are prioritized over the first set of rules;
- modify the received DID-related data such that the received DID-related data conforms to whichever rules were applied to the DID-related data; and
- provide the modified DID-related data to the DID owner such that the DID owner is able to view the modified DID-related data according to the applied rules.

* * * * *